US009191311B2

(12) United States Patent
Liu et al.

(10) Patent No.: US 9,191,311 B2
(45) Date of Patent: Nov. 17, 2015

(54) METHOD AND APPARATUS FOR PROCESSING A MULTICAST PACKET

(75) Inventors: Enhui Liu, Beijing (CN); Xinping Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 402 days.

(21) Appl. No.: 13/528,586

(22) Filed: Jun. 20, 2012

(65) Prior Publication Data

US 2012/0257625 A1 Oct. 11, 2012

Related U.S. Application Data

(63) Continuation of application No. PCT/CN2010/079609, filed on Dec. 9, 2010.

(30) Foreign Application Priority Data

Dec. 22, 2009 (CN) .......................... 2009 1 0254359

(51) Int. Cl.
*H04J 3/26* (2006.01)
*H04L 12/713* (2013.01)
*H04L 12/761* (2013.01)
(Continued)

(52) U.S. Cl.
CPC .......... *H04L 45/586* (2013.01); *H04L 12/1854* (2013.01); *H04L 45/16* (2013.01); *H04L 49/201* (2013.01); *H04L 49/70* (2013.01); *H04L 12/1886* (2013.01)

(58) Field of Classification Search
USPC ............... 370/312, 389, 390, 392, 395.3, 432
See application file for complete search history.

(56) References Cited

U.S. PATENT DOCUMENTS

| 7,953,089 | B1 * | 5/2011 | Ramakrishnan et al. ...... 370/392 |
| 8,208,418 | B1 * | 6/2012 | Grosser et al. ................ 370/312 |
| 2002/0080720 | A1 * | 6/2002 | Pegrum et al. ................ 370/236 |

(Continued)

FOREIGN PATENT DOCUMENTS

| CN | 1208929 C | 6/2005 |
| CN | 1848807 A | 10/2006 |

(Continued)

OTHER PUBLICATIONS

International Search Report dated Mar. 17, 2011 in connection with International Patent Application No. PCT/CN2010/079609.

(Continued)

*Primary Examiner* — Kwang B Yao
*Assistant Examiner* — Nguyen Ngo

(57) ABSTRACT

The embodiments of the present invention relate to the field of computer networks, and disclose a method and an apparatus for processing a multicast packet. The method includes receiving a multicast packet, acquiring a local router interface corresponding to the multicast packet according to a multicast routing entry carried in the multicast packet, and forwarding the multicast packet through the acquired local router interface to a clustered routing system interface for further transfer. The embodiments of the present invention can cluster several routing devices into a virtual routing system which externally acts as a single routing node for supporting a multicast service, so as to implement the efficient and reliable forwarding of the multicast packet in a clustered routing system with virtual aggregation, and enable the clustered routing system to support the multicast service with high efficiency and quality.

7 Claims, 8 Drawing Sheets

(51) Int. Cl.
*H04L 12/931* (2013.01)
*H04L 12/18* (2006.01)

(56) References Cited

U.S. PATENT DOCUMENTS

| | | | |
|---|---|---|---|
| 2005/0027782 A1 | 2/2005 | Jalan et al. | |
| 2005/0243825 A1* | 11/2005 | Bitar et al. | 370/390 |
| 2006/0002391 A1 | 1/2006 | Takihiro et al. | |
| 2006/0015928 A1* | 1/2006 | Setty et al. | 725/148 |
| 2007/0104192 A1* | 5/2007 | Yoon et al. | 370/389 |
| 2008/0165773 A1* | 7/2008 | Kobayashi | 370/390 |
| 2011/0032936 A1* | 2/2011 | Ashwood-Smith et al. | 370/390 |
| 2011/0064077 A1* | 3/2011 | Wen | 370/390 |

FOREIGN PATENT DOCUMENTS

| | | |
|---|---|---|
| CN | 100384131 C | 4/2008 |
| JP | 2003143193 A | 5/2003 |
| JP | 2006-019785 | 1/2006 |
| WO | WO 2009/082188 A2 | 7/2009 |

OTHER PUBLICATIONS

Written Opinion of the International Searching Authority dated Mar. 17, 2011 in connection with International Patent Application No. PCT/CN2010/079609.

Takeru Inoue, et al., "Design and Implementation of Advanced Multicast Router Based on Cluster Computing", Proceedings of the 2005 11th International Conference on Parallel and Distributed Systems, 2005, 7 pages.

Supplementary European Search Report dated Jan. 18, 2013 in connection with European Patent Application No. EP 10 83 8628.

Partial Translation of First Chinese Office Action dated Aug. 1, 2012 in connection with Chinese Patent Application No. 200910254359.0, 10 pages.

* cited by examiner

METHOD AND APPARATUS FOR PROCESSING A MULTICAST PACKET

CROSS-REFERENCE TO RELATED APPLICATIONS

This application is a continuation of International Application No. PCT/CN2010/079609, filed on Dec. 9, 2010, which claims priority to Chinese Patent Application No. 200910254359.0, filed on Dec. 22, 2009, both of which are hereby incorporated by reference in their entireties.

TECHNICAL FIELD

The present invention relates to the field of computer networks, and in particular, to a method and an apparatus for processing a multicast packet.

BACKGROUND

The conventional network architecture has a hierarchical structure of two or more layers. As shown in FIG. 1, a network can be divided into different layers (including a core layer, a convergence layer, an edge access layer, and a peer layer) according to a function and a deployment location of each layer, the reliability between layers is generally improved by adopting the dual-homing redundant connection, and traffics of users are converged layer by layer. The access layer is responsible for network access of a user terminal and used for providing abundant user interface types, and has a wide node distribution and a high interface density. The convergence layer is responsible for converging traffics of access nodes and used for expanding service coverage range of a core node, and has abundant interface types, a strong convergence capability, and an integrated service processing capability. The core layer is responsible for high-speed forwarding and inter-area service interworking, and has a small number of nodes.

In order to integrate and simplify the network structure and improve resource utilization, in the existing network architecture, when a point-to-multipoint switching packet is processed, a method is used in which two or more master switching devices in the same network layer form a virtual network device to reduce the complexity caused by using multiple redundant components.

In addition, in an existing hardware clustered router, in order to adapt to a huge data exchange capacity between devices in the cluster, multiple high-end routers are connected to a central switching matrix frame chassis through an ultra-short-range optical fiber, to form a large clustered router of one fabric card chassis with four linecard chassis, two fabric card chassis with eight linecard chassis, or four fabric card chassis with sixteen linecard chassis. Due to the introduction of the dedicated central switching matrix frame and the very short reach optical fiber interconnection technology, the network topology structure is complicated, and the routing convergence and stability are poor.

To sum up, the processing for a multicast packet is not so sound at present, regardless of the virtual cluster convergence of the devices on the same network layer for simplifying the network structure, or the hardware clustered router applied at the core node or a super node.

SUMMARY

Embodiments of the present invention provide a method and an apparatus for processing a multicast packet, so as to implement the efficient and reliable routing forwarding of the multicast packet in a clustered routing system with virtual aggregation.

In order to solve foregoing technical problems, embodiments of the present invention provide the following technical solutions.

An embodiment of the present invention provides a method for processing a multicast packet, which includes:

receiving a multicast packet;

acquiring a local router interface corresponding to the multicast packet according to a multicast routing entry carried in the multicast packet; and forwarding the multicast packet through the acquired local router interface to a clustered routing system interface for further transfer.

An embodiment of the present invention provides an apparatus for processing a multicast packet, which includes:

a receiving unit, configured to receive a multicast packet;

an acquisition unit, configured to acquire a local router interface corresponding to the multicast packet according to a multicast routing entry carried in the multicast packet received by the receiving unit; and a forwarding unit, configured to forward the multicast packet, which is received by the receiving unit, through the local router interface acquired by the acquisition unit to a clustered routing system interface for further transfer.

Compared with the prior art, in the embodiments of the present invention, the local router interface corresponding to the multicast packet can be acquired according to the multicast routing entry carried in the multicast packet, and then the multicast packet is forwarded through the local router interface to the clustered routing system interface for further transfer. In the embodiments of the present invention, several routing devices are clustered into a virtual routing system, which externally acts as a single routing node for supporting a multicast service, so as to implement the efficient and reliable routing forwarding of the multicast packet in a clustered routing system with virtual aggregation and enable the clustered routing system to support the multicast service with high efficiency and quality.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION

In order to make the objectives, features, and advantages of the embodiments of the present invention more comprehensible, the embodiments of the present invention are described in further detail in the following through specific embodiments with reference to the accompanying drawings.

Embodiment 1

Figure 1:
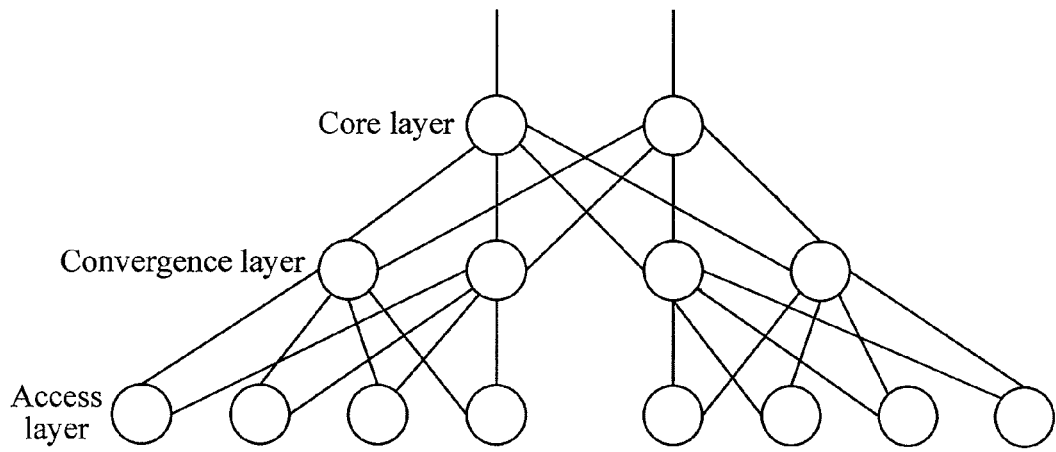
FIG. 1 is a schematic structural diagram of layers of a conventional network architecture.
Figure 2:
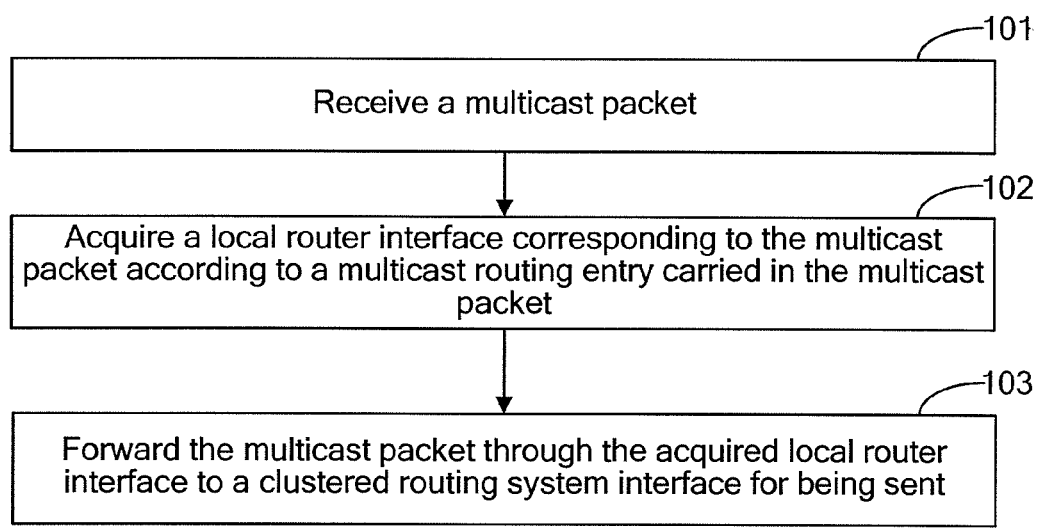
FIG. 2 is a schematic flow chart diagram of a method for processing a multicast packet according to an embodiment of the present invention.

Referring to FIG. 2, FIG. 2 is a schematic flow chart diagram of a method for processing a multicast packet provided in Embodiment 1 of the present invention. As shown in FIG. 2, the method may include the following steps.

101: Receive a multicast packet.

The multicast packet received in 101 may carry a multicast routing entry, and the multicast routing entry may be expressed as (S, G), where S is a source address and G is a group address; or the multicast routing entry may be expressed as (*, G), where * is any source address, and G is a group address.

In an embodiment, a clustered routing system interface corresponding to the multicast packet may be acquired by querying an external multicast forwarding information base (eMFIB, external Multicast Forwarding Information Base). Mapping between the multicast routing entry (S, G) and the clustered routing system interface is pre-established in the eMFIB.

102: Acquire a local router interface corresponding to the multicast packet according to the multicast routing entry carried in the multicast packet.

In an embodiment, after the clustered routing system interface corresponding to the multicast packet is acquired by querying the eMFIB, a local router interface corresponding to the multicast packet may be acquired by further querying an internal forwarding information base (IFIB, Internal Forwarding Information Base). Mapping between the clustered routing system interface and the local router interface in a clustered routing system is pre-established in the IFIB.

Figure 3:
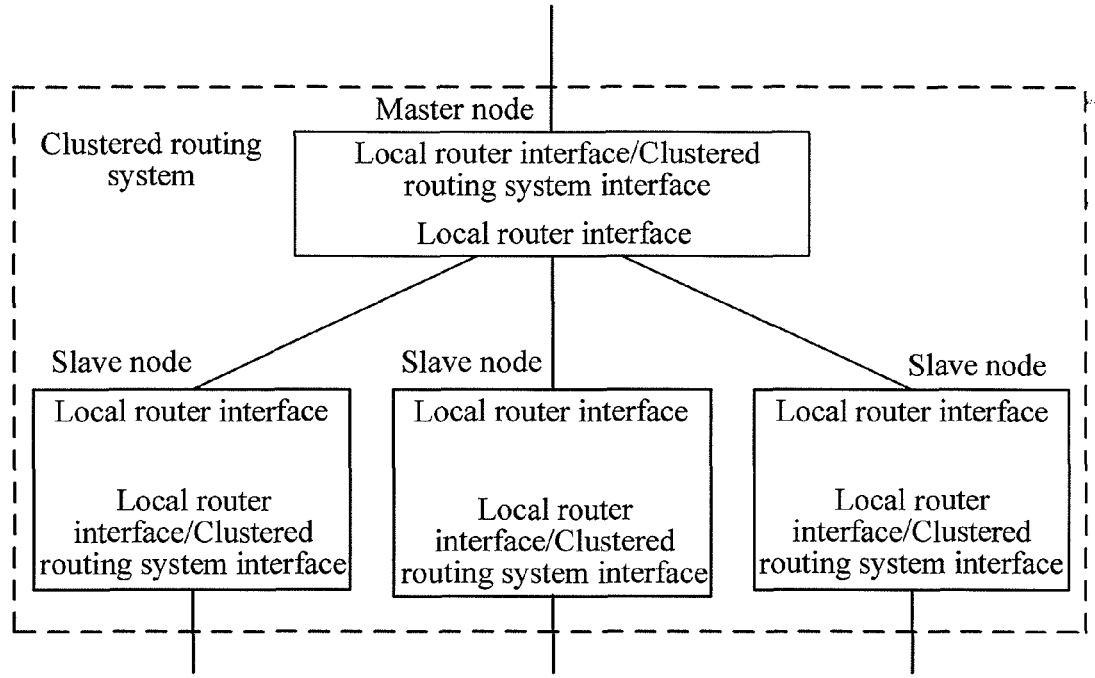
FIG. 3 is a schematic diagram of interface distribution of a clustered routing system according to an embodiment of the present invention.
Figure 5:
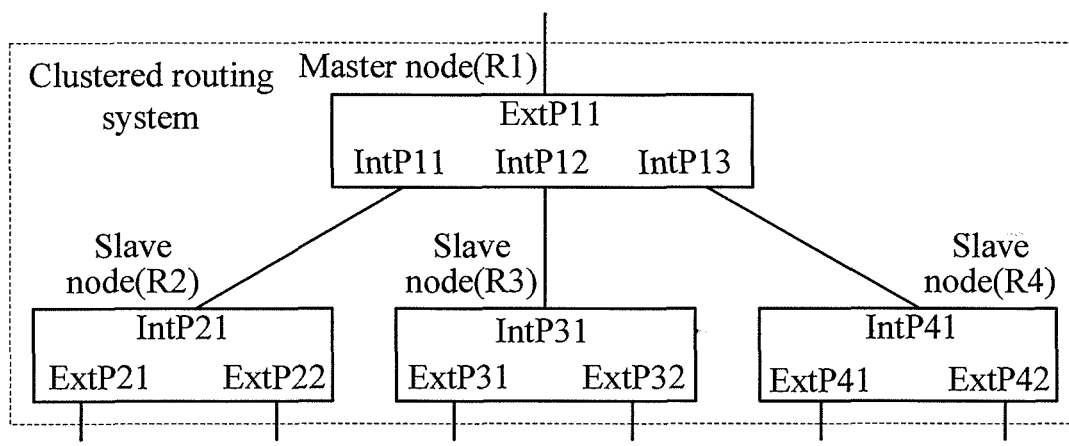
FIG. 5 is a schematic diagram of interface distribution of another clustered routing system according to an embodiment of the present invention.

Referring to FIG. 3 and FIG. 5, in a clustered routing system, a master node and several slave nodes are included, and the master node is connected to each slave node. For example, a master node may be a large-capacity and high-performance router, and a slave node may be a small-capacity and low-performance router. An external interface through which the master node and the slave node are connected to external routers is a clustered routing system interface; an interface through which the master node and the slave node are connected to each other is an internal connection interface; all interfaces of the master node or the slave node are local router interfaces; the local router interface may also be a clustered routing system interface; and according to the forwarding direction of a packet, each interface is correspondingly referred to as an inbound interface or an outbound interface.

When multiple clustered routing system interfaces correspond to one local router interface in a clustered routing system, routing entries corresponding to a multicast packet required to be forwarded to the multiple clustered routing system interfaces may be combined, and the multicast packet is directly sent to the local router interface. In the clustered routing system, only one multicast packet is needed to implement multicast service of the multiple clustered routing system interfaces, so as to save energy consumption and improve resource utilization.

The eMFIB and the IFIB may be saved on each local router in the clustered routing system, so that after any local router receives an externally input multicast packet carrying the multicast routing entry, the local router may acquire the local router interface corresponding to the multicast packet by querying the eMFIB and the IFIB respectively according to the multicast routing entry carried in the multicast packet, and then forwards the multicast packet.

103: Forward the multicast packet through the acquired local router interface to the clustered routing system interface for further transfer.

Optionally, when the multicast packet is forwarded through the clustered routing system interface, the value of time to live (TTL, Time To Live) carried in the multicast packet may be decreased by 1.

In an embodiment, when the multicast packet is forwarded, an identity may be encapsulated in the multicast packet, and the identity may be an identity of the clustered routing system interface, or an internal shared tree (IST, Internal Shared Tree) identity which is a common identity of multicast packets with the same clustered routing system interface. Quick identification of a forwarding interface may be implemented by encapsulating an identity in the multicast packet, so that the multicast packet can be forwarded from a corresponding interface quickly and the forwarding speed is improved.

The multicast routing processing method provided in the embodiment of the present invention is not limited to a two-layer hierarchical tree topology of an internal connection topology in the embodiment, and is also applicable to various heterogeneous complex topologies, such as a hierarchical tree topology of multiple layers and multiple hops or a ring topology.

In the embodiment of the present invention, the local router interface corresponding to the multicast packet can be acquired according to the multicast routing entry carried in the multicast packet, and then the multicast packet is forwarded through the local router interface to the clustered routing system interface for further transfer. In the embodiment of the present invention, several routing devices may be clustered into a virtual routing system, which externally acts as a single routing node to support multicast service, so as to implement the efficient and reliable routing forwarding of the multicast packet in a clustered routing system with virtual aggregation, and enable the clustered routing system to support the multicast service with high efficiency and quality.

Embodiment 2

Figure 4:
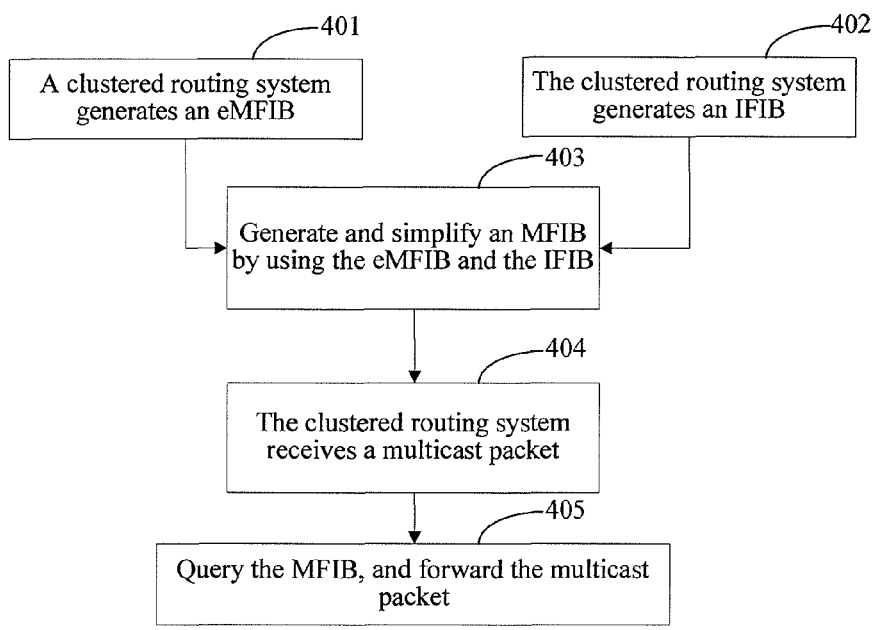
FIG. 4 is a schematic flow chart diagram of another method for processing a multicast packet according to an embodiment of the present invention.

Referring to FIG. 4, FIG. 4 is a schematic flow chart diagram of a method for processing a multicast packet provided in Embodiment 2 of the present invention. As shown in FIG. 4, the method may include:

401: A clustered routing system generates an eMFIB.

The eMFIB is configured to store mapping between a multicast routing entry (S, G) and a clustered routing system interface.

For example, the clustered routing system may generate the eMFIB by using a dynamic concentration manner and a distribution generating manner; however, the present invention is not limited thereto. A Specific implementation for generating the eMFIB by using the dynamic concentration manner is as follows.

A1: The clustered routing system is considered as a routing node, an interconnection mechanism in the clustered routing system is shielded, and attention is only paid to an external connection interface of the clustered routing system.

B1: A master R1 of a high-performance convergence router is designated as a master node, and the master R1 supports a multicast routing calculation protocol (for example, PIM-DM/PIM-SIM/MSDP/MBGP); and a slave node (R2, R3, and R4) does not support any multicast routing calculation protocol.

C1: A packet is transmitted inside the clustered routing system: the slave node transmitts a neighbor packet, which is received from an external connection interface (ExtP) of the clustered routing system of the slave node, to the master node (master R1) through an internal connection interface (IntP).

D1: A multicast routing table is calculated: the master node (master R1) runs the multicast routing calculation protocol according to the neighbor information received from the external connection interface ExtP of the clustered routing system of each slave node, generates the eMFIB, and executes a corresponding multicast control function.

E1: The eMFIB is delivered: the master node performs centralized computation to generate the eMFIB, and delivers the eMFIB to each master node and slave node in the clustered routing system.

A specific implementation for generating the eMFIB by using the distribution generation manner is as follows.

A2: The clustered routing system is considered as one routing node, interconnection mechanism in the clustered routing system is shielded, and attention is only paid to an external connection interface of the clustered routing system.

B2: External information is received: external neighbor information is received by an external connection interface of each node (R1, R2, R3, and R4) of the clustered routing system.

C2: Information is transmitted and synchronized inside the clustered routing system: each node forwards and synchronizes the information inside the clustered routing system.

D2: A multicast routing table is calculated: each node supports a multicast routing calculation protocol (for example, PIM-DM/PIM-SIM/MSDP/MBGP, etc.), generates an external network topology graph according to the neighbor information, and calculates a routing table by taking the clustered routing system as one node to generate the eMFIB.

In a case of a network structure and interface distribution as shown in FIG. 5, by taking a multicast address of 224.1.0.0 as an example, the eMFIB generated in 401 may be as shown in Table 1 below:

TABLE 1

| | eMFIB | |
|---|---|---|
| (S, G) | Inbound interface of clustered routing system (iif) | Outbound interface list of clustered routing system (oiflist) |
| (S1, 224.1.0.0) | ExtP11 | ExtP21, ExtP22, ExtP31, ExtP32 |
| (S2, 224.2.0.0) | ExtP31 | ExtP11, ExtP41, ExtP42 |

402: The clustered routing system generates an internal forwarding information base IFIB.

The form of the IFIB may be as shown in a table below. Table 2 is an IFIB of the master R1, Table 3 is an IFIB of the slave R2, and Table 4 is an IFIB of the slave R3.

TABLE 2

| IFIB of the master R1 | |
|---|---|
| Outbound interface of clustered routing system | Outbound interface of local router |
| ExtP11 | ExtP11 |
| ExtP21 | IntP11 |
| ExtP22 | IntP11 |
| ExtP31 | IntP12 |
| ExtP32 | IntP12 |

TABLE 3

| IFIB of the slave R2 | |
|---|---|
| Outbound interface of clustered routing system | Outbound interface of local router |
| ExtP21 | ExtP21 |
| ExtP22 | ExtP22 |
| others | IntP21 |

TABLE 4

| IFIB of the slave R3 | |
|---|---|
| Outbound interface of clustered routing system | Outbound interface of local router |
| ExtP31 | ExtP31 |
| ExtP32 | ExtP32 |
| others | IntP31 |

For example, the master R1 may obtain, according to a multicast routing entry (S1, 224.1.0.0) carried in a multicast packet, outbound interfaces ExtP21, ExtP22, ExtP31, and ExtP32 of the clustered routing system from the eMFIB shown in Table 1; and then, may further obtain local router interfaces ExtP11, IntP11, and IntP12 corresponding to the multicast packet from the IFIB shown in Table 2.

The step 401 in which eMFIB is generated and the step 402 in which IFIB is generated have no order limitation, which is also applicable to subsequent embodiments.

403: Generate and simplify a multicast forwarding information base (MFIB, Multicast Forwarding Information Base) by using the eMFIB and the IFIB.

In 403, mapping between the multicast routing entry and the local router interface in the clustered routing system may be established according to mapping between the multicast routing entry and the clustered routing system interface (that is, the eMFIB), as well as mapping between the clustered routing system interface and the local router interface in the clustered routing system (that is, the IFIB), and saved in an MFIB of each local router.

The MFIB may be combined and generated by each node in the clustered routing system, or uniformly generated by the master node for each node, and delivered to the slave nodes.

A process for generating the MFIB of each node in a cluster is described with reference to a forwarding path of a (S1, 224.1.0.0) multicast packet in the clustered routing system.

Generation of an MFIB of the master R1: the master node R1 queries the eMFIB shown in Table 1, and learns that the multicast routing entry needs to enter from a clustered routing system interface ExtP11 and forward to clustered routing system interfaces ExtP21, ExtP22, ExtP31, and ExtP32 for further transfer; queries the IFIB of the master R1 shown in Table 2 with an outbound interface of the clustered routing system as an index, and learns that interfaces ExtP21 and ExtP22 are corresponding to the interface IntP11 of a local router, and the interfaces ExtP31 and ExtP32 are corresponding to the interface IntP12 of the local router, so that IntP11 and IntP12 are outbound interfaces of the local routers in the MFIB table; and queries the IFIB of the master R1 shown in Table 2 with the inbound interface ExtP11 of the clustered routing system as an index, and learns that the outbound interface of the local router is ExtP11, which is therefore an inbound interface of the local router in the MFIB table. Therefore, an entry in the MFIB table of the master R1 is generated, the rest may be deduced by analogy, and all entries of the MFIB of the master R1 can be generated, as shown in Table 5 below.

TABLE 5

MFIB of master R1

| (S, G) | Inbound interface of Local R | Outbound interface of Local R |
|---|---|---|
| (S1, 224.1.0.0) | ExtP11 | IntP11, IntP12 |
| ... | ... | ... |

Further, according to the method, the MFIB of the slave R2 may be generated, as shown in Table 6. The slave node R2 queries the eMFIB shown in Table 1, and learns that the multicast routing entry needs to enter the clustered routing system from the interface ExtP11, and is forwarded to the interfaces ExtP21, ExtP22, ExtP31, and ExtP32 to be sent out of the clustered routing system interface; queries the IFIB of the slave R2 shown in Table 3 with the outbound interface the clustered routing system as an index, and learns that the interfaces ExtP21 and ExtP22 are corresponding to the interfaces ExtP21 and ExtP22 of the local router, respectively, the interfaces ExtP31 and ExtP32 are corresponding to the interface IntP21 of the local router, and ExtP21, ExtP22 and IntP21 are therefore outbound interfaces of the local router in the MFIB table; and queries the IFIB of the slave R2 shown in Table 3 with the inbound interface ExtP11 of the clustered routing system as an index, and learns that the outbound interface of the local router is ExtP21, which is therefore the inbound interface of the local router of the MFIB table. Accordingly, an entry in the MFIB table of the slave R2 is generated, the rest may be deduced by analogy, and all entries of the MFIB of the slave R2 are generated, as shown in a table below.

TABLE 6

MFIB of slave R2

| (S, G) | Inbound interface of Local R | Outbound interface of Local R |
|---|---|---|
| (S1, 224.1.0.0) | IntP21 | ExtP21, ExtP22, IntP21 |
| ... | ... | ... |

Further, according to the method, the MFIB table of the slave R3 is generated as follows.

TABLE 7

MFIB of slave R3

| (S, G) | Inbound interface of Local R | Outbound interface of Local R |
|---|---|---|
| (S1, 224.1.0.0) | IntP31 | ExtP31, ExtP32, IntP31 |
| ... | ... | ... |

In the process of generating the MFIB, the MFIB may be simplified by the following means, for example:

1) Mechanism of Replicating a Multicast Packet with the Same Outbound Interface for Once In a case that at least two clustered routing system interfaces are corresponding to one local router interface, multicast packets corresponding to the at least two clustered routing system interfaces are combined, one copy of the combined multicast packet is made and sent to the local router interface, so as to inhibit the repeated replication of the multicast packet, and save energy consumption.

For example, the master R1 combines the multicast packets bound for the interfaces ExtP21 and ExtP22, and sends one copy of the combined multicast packet to IntP11; and combines the multicast packets bound for the interfaces ExtP31 and ExtP32, sends one copy of the combined multicast packet to IntP12, and sends the copy to IntP31.

2) Loop Suppression Mechanism

When a local router determines that an interface through which the multicast packet is to be sent to another local router and an interface through which the multicast packet enters the local router are the same, the interface through which the multicast packet is sent to another local router is deleted from a preset forwarding interface list to prevent the multicast packet from being repeatedly forwarded between local routers, or prevent the same multicast packet from being successively forwarded by local routers, so as to prevent forming a loop or a deadlock and prevent a waste of system resources.

For example, if the slave R2 determines that an outbound interface of a multicast packet bound for the interfaces ExtP31 and ExtP32 is IntP21, which is the same as the inbound interface IntP21 through which the multicast packet enters the slave R2, the multicast packet is not forwarded, and the outbound interface IntP21 is deleted from the MFIB of the slave R2 or a preset forwarding interface list. Similarly, if the slave R3 determines that an outbound interface of a multicast packet bound for the interfaces ExtP21 and ExtP22 is IntP31, which is the same as the inbound interface IntP31 through which the multicast packet enters R3, the multicast packet is not forwarded, and the interface IntP31 is deleted from the MFIB of R3. Entries of the MFIBs of the slave R2 and the slave R3 are shown as follows.

TABLE 8

MFIB of slave R2

| (S, G) | Inbound interface of Local R | Outbound interface of Local R |
|---|---|---|
| (S1, 224.1.0.0) | IntP21 | ExtP21, ExtP22 |
| ... | ... | ... |

TABLE 9

MFIB of slave R3

| (S, G) | Inbound interface of Local R | Outbound interface of Local R |
|---|---|---|
| (S1, 224.1.0.0) | IntP31 | ExtP31, ExtP32 |
| ... | ... | ... |

404: The clustered routing system receives a multicast packet.

The master R1 in the clustered routing system receives the multicast packet carrying the multicast routing entry (S1, 224.1.0.0).

405: Query the MFIB, and forward the multicast packet.

After the multicast packet is forwarded from the outbound interface of the clustered routing system, the TTL value carried in the multicast packet is decreased by 1.

Through the embodiment of the present invention, several routing devices may be clustered into one virtual routing node, the MFIB is generated through the combination of the eMFIB and the IFIB, then the MFIB is queried directly to forward the multicast packet, thereby reducing the internal forwarding times of the multicast packet, improving the routing convergence rate and stability, and reducing the fault management complexity.

Embodiment 3

Figure 6:
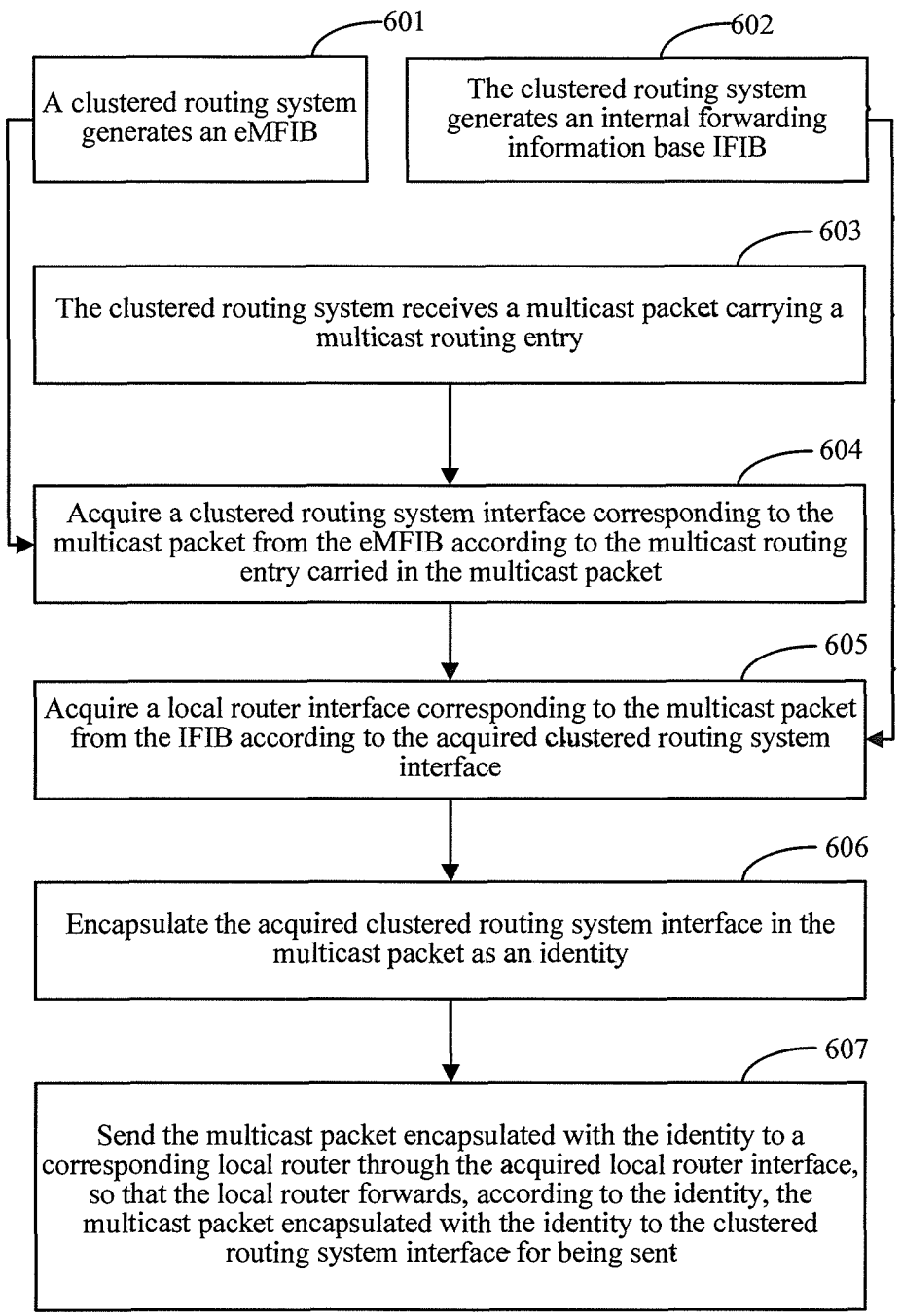
FIG. 6 is a schematic flow chart diagram of another method for processing a multicast packet according to an embodiment of the present invention.

Referring to FIG. 6, FIG. 6 is a schematic flow chart diagram of a method for processing a multicast packet provided in Embodiment 3 of the present invention. As shown in FIG. 6, the method may include the following steps.

601: A clustered routing system generates an eMFIB.

A specific implementating method for generating the eMFIB in 601 is introduced in detail in Embodiment 2, and is not repeated in this embodiment.

602: The clustered routing system generates an internal forwarding information base IFIB.

A specific implementating method for generating the IFIB in 602 is introduced in detail in Embodiment 2, and is not repeated in this embodiment.

603: The clustered routing system receives a multicast packet carrying a multicast routing entry.

604: Acquire, from the eMFIB, a clustered routing system interface corresponding to the multicast packet according to the multicast routing entry carried in the multicast packet.

605: Acquire, from the IFIB, a local router interface corresponding to the multicast packet according to the acquired clustered routing system interface.

606: Encapsulate the acquired clustered routing system interface in the multicast packet as an identity.

607: Send the multicast packet encapsulated with the identity to a corresponding local router through the acquired local router interface, so that the local router forwards the multicast packet encapsulated with the identity to the clustered routing system interface according to the identity for further transfer.

For example, if a master R1 receives an externally input multicast packet carrying a multicast routing entry, the master R1 may query an eMFIB as shown in Table 1, to acquire a clustered routing system interface corresponding to the multicast packet; query an IFIB of the master R1 with the acquired clustered routing system interface as an index, to acquire a local router interface corresponding to the multicast packet; encapsulate the acquired clustered routing system interface in the multicast packet as an identity, and then send the multicast packet to a corresponding local router, and the corresponding local router forwards the multicast packet encapsulated with the identity to the clustered routing system interface through a local routing interface according to the identity for further transfer.

The corresponding local router queries its own IFIB according to the identity encapsulated in the multicast packet, to acquire a local router interface of the corresponding local router, sends the multicast packet encapsulated with the identity to a corresponding local router at a next level through the acquired local router interface, and the rest may be deduced by analogy, till the multicast packet encapsulated with the identity is forwarded to the clustered routing system interface for further transfer.

The identity may enable a slave node to rapidly send the packet to the outbound interface of the clustered routing system according to the clustered routing system's outbound interface indicated by the identity, so as to improve the forwarding efficiency.

In this embodiment, if an interface through which the multicast packet is to be sent to another local router and an interface through which the multicast packet enters the local router are the same, the interface through which the multicast packet is sent to another local router is deleted from the IFIB or a preset forwarding interface list to prevent the multicast packet from being repeatedly forwarded between local routers, or prevent the same multicast packet from being successively forwarded by local routers, so as to prevent forming a loop or a deadlock and prevent a waste of system resources.

In addition, when the multicast packet is sent from the clustered routing system interface, the identity is removed from the multicast packet, and a TTL value carried in the multicast packet is decreased by 1.

In this embodiment, after the clustered routing system interface and the local router interface which are corresponding to the multicast packet are acquired by querying the eMFIB and the IFIB, respectively, the clustered router interface may be encapsulated in the multicast packet as an identity and sent to the local router, so that the local router can rapidly forward, according to the identity, the multicast packet to the clustered routing system interface for further transfer, so as to prevent the eMFIB from being queried by all local routers, thereby improving the forwarding efficiency, reducing the internal forwarding times of the multicast packet, improving the routing convergence rate and stability, and reducing the fault management complexity.

Embodiment 4

Figure 7:
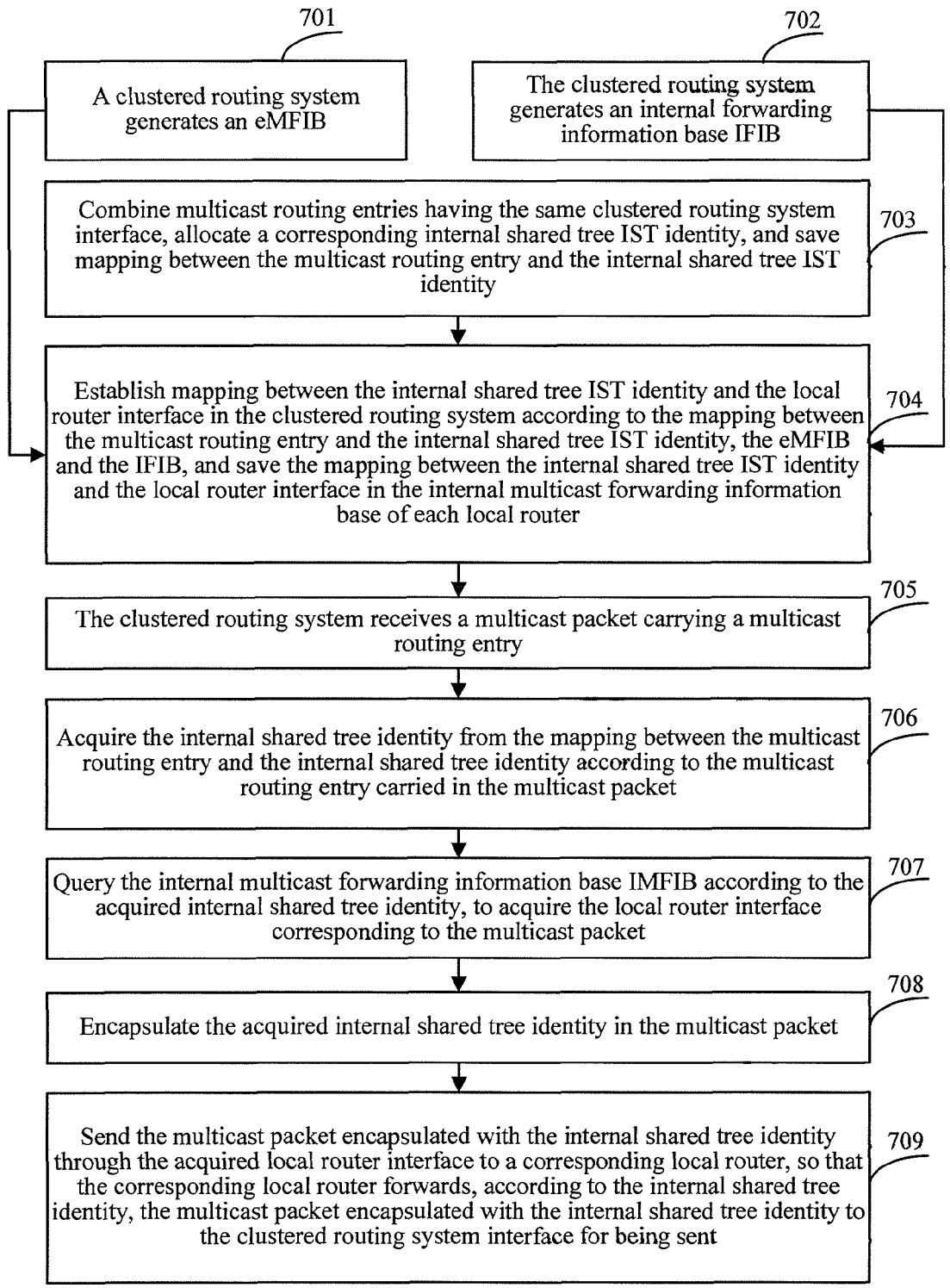
FIG. 7 is a schematic flow chart diagram of still another method for processing a multicast packet according to an embodiment of the present invention.

Referring to FIG. 7, FIG. 7 is a schematic flow chart diagram of a method for processing a multicast packet provided in Embodiment 4 of the present invention. As shown in FIG. 7, the method may include:

701: A clustered routing system generates an eMFIB.

A specific implementating method for generating the eMFIB in 701 is introduced in detail in Embodiment 2, and is not repeated in this embodiment.

702: The clustered routing system generates an internal forwarding information base IFIB.

A specific implementating method for generating the IFIB in 702 is introduced in detail in Embodiment 2, and is not repeated in this embodiment.

703: Combine multicast routing entries having the same clustered routing system interface, allocate a corresponding internal shared tree identity IST, and save mapping between the multicast routing entry and the internal shared tree identity IST.

For example, multicast routing entries (S, G) and (*, G) having the same clustered routing system interface may be combined, and an IST identity is allocated to the combined entry, as shown in Table 10.

TABLE 10

Mapping table of multicast routing entry and IST identity

| (S, G)/(*, G) | IST identity |
|---|---|

The step 701 in which eMFIB is generated, and the step 702 in which IFIB, and the step 703 in which the internal shared tree identity is generated have no order limitation, which is also applicable to subsequent embodiments.

704: Establish mapping between the internal shared tree identity IST and the local router interface in the clustered routing system according to the mapping between the multicast routing entry and the internal shared tree identity IST, the eMFIB and the IFIB, and save the mapping between the internal shared tree IST identity and the local router interface in the internal multicast forwarding information base (IMFIB, Internal Multicast Forwarding Information Base) of each local router.

The generating the internal multicast forwarding information base is substantially the same as the manner in 403 in the foregoing embodiment in which the multicast forwarding information base is generated and simplified by using the eMFIB and the IFIB, except that the internal shared tree identity IST is used to replace the multicast routing entries having the same clustered routing system interface. The IMFIB used for saving the mapping between the internal shared tree identity IST and the local router interface in the clustered routing system may be as shown in Table 11:

TABLE 11

| IMFIB | | |
|---|---|---|
| IST identity | Inbound interface of local router | Outbound interface of local router |
| ... | ... | ... |

705: The clustered routing system receives a multicast packet carrying a multicast routing entry.

706: Acquire the internal shared tree identity from the mapping between the multicast routing entry and the internal shared tree identity according to the multicast routing entry carried in the multicast packet.

For example, according to the multicast routing entry carried in the multicast packet, the internal shared tree identity may be acquired from Table 10.

707: Query the internal multicast forwarding information base IMFIB according to the acquired internal shared tree identity, to acquire the local router interface corresponding to the multicast packet.

708: Encapsulate the acquired internal shared tree identity in the multicast packet.

709: Send the multicast packet encapsulated with the internal shared tree identity through the acquired local router interface to a corresponding local router, so that the corresponding local router forwards, according to the internal shared tree identity, the multicast packet encapsulated with the internal shared tree identity to the clustered routing system interface for further transfer.

The corresponding local router queries its own IMFIB according to the internal shared tree identity encapsulated in the multicast packet, to acquire a local router interface of the corresponding local router, sends the multicast packet encapsulated with the internal shared tree identity to a corresponding local router at a next level through the acquired local router interface, and the rest may be deduced by analogy, till the multicast packet encapsulated with the internal shared tree identity is forwarded to the clustered routing system interface for further transfer.

When the multicast packet is sent from the clustered routing system interface, the identity is removed from the multicast packet.

Preferably, when the multicast packet is sent through the clustered routing system interface, a time to live (TTL, Time To Live) value carried in the multicast packet is decreased by 1.

Furthermore, when an interface through which the multicast packet is sent to another local router is the same as an interface through which the multicast packet enters the local router, the interface through which the multicast packet is sent to the another local router is deleted from the IFIB or a preset forwarding interface list to prevent the multicast packet from being repeatedly forwarded between local routers, or prevent the same multicast packet from being successively forwarded by several local routers, so as to prevent forming a loop or a deadlock and prevent a waste of system resources.

In the embodiment of the present invention, the multicast routing entries having the same clustered routing system interface are combined, thereby reducing the number of entries of the internal multicast forwarding information base, improving the forwarding efficiency, reducing the internal forwarding times of the multicast packet, improving the routing convergence rate and stability, and reducing the fault management complexity.

Embodiments of the present invention provide, in addition to the method for processing a multicast packet, several apparatuses for processing a multicast packet, which are detailed in the following embodiments.

Embodiment 5

Figure 8:
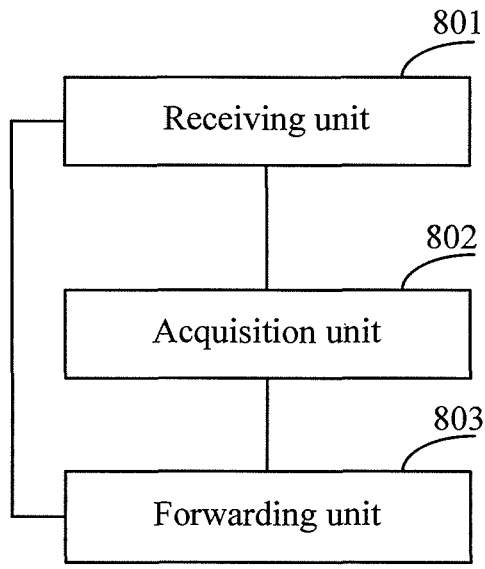
FIG. 8 is a schematic structural diagram of an apparatus for processing a multicast packet according to an embodiment of the present invention.

Referring to FIG. 8, FIG. 8 is a schematic structural diagram of an apparatus for processing a multicast packet provided in Embodiment 5 of the present invention. As shown in FIG. 8, the apparatus may include:

a receiving unit 801, configured to receive a multicast packet;

an acquisition unit 802, configured to acquire a local router interface corresponding to the multicast packet according to a multicast routing entry carried in the multicast packet received by the receiving unit 801; and a forwarding unit 803, configured to forward the multicast packet, which is received by the receiving unit 801, through the local router interface acquired by the acquisition unit 803 to a clustered routing system interface for further transfer.

Through the apparatus for processing a multicast packet provided in the embodiment of the present invention, several routing devices can be clustered into a virtual routing system which externally acts as a single routing node for supporting a multicast service, so as to implement the efficient and reliable routing forwarding of the multicast packet in a clustered routing system with virtual aggregation, and enable the clustered routing system to support the multicast service with high efficiency and quality.

Figure 9:
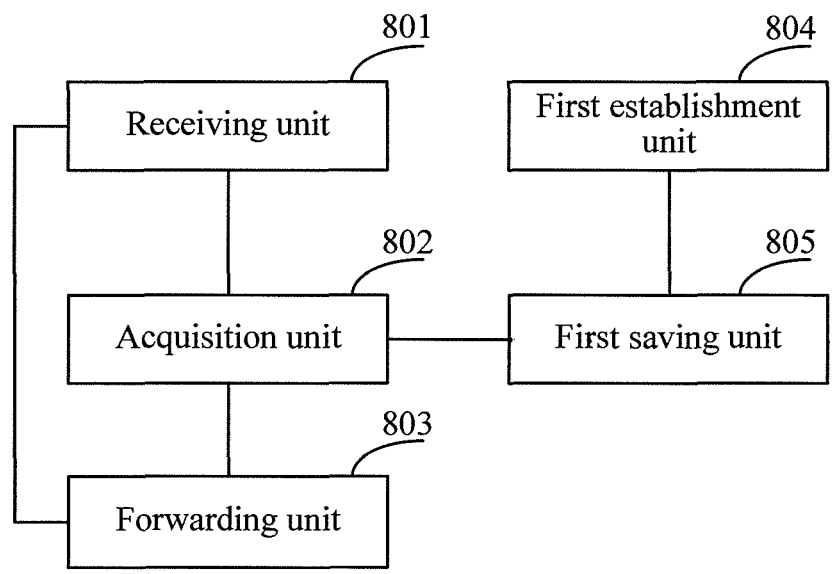
FIG. 9 is a schematic structural diagram of another apparatus for processing a multicast packet according to an embodiment of the present invention.

Referring to FIG. 9, FIG. 9 is a schematic structural diagram of another apparatus for processing a multicast packet provided in Embodiment 5 of the present invention. Compared with the multicast packet apparatus shown in FIG. 8, the apparatus for processing a multicast packet shown in FIG. 9 is additionally disposed with the following units.

A first establishment unit 804 is configured to establish mapping between the multicast routing entry and the local router interface in a clustered routing system according to mapping between the multicast routing entry and the clustered routing system interface, and mapping between the clustered routing system interface and the local router interface in the clustered routing system before the receiving unit 801 receives the multicast packet.

The mapping between the multicast routing entry and the local router interface in the clustered routing system established by the first establishment unit 804 may be the same as those in Table 2, Table 3, and Table 4 in the foregoing embodiment, and is not repeated in this embodiment.

A first saving unit 805 is configured to save the mapping between the multicast routing entry and the local router interface in the clustered routing system established by the first establishment unit in a multicast forwarding information base MFIB of each local router.

The MFIB may be the same as those in Table 5, Table 6, and Table 7 in the foregoing embodiment, and is not repeated in this embodiment.

In this case, the acquisition unit 802 may specifically query the multicast forwarding information base MFIB according to the multicast routing entry carried in the multicast packet received by the receiving unit 801, to acquire the local router interface corresponding to the multicast packet.

In an embodiment, when at least two clustered routing system interfaces are corresponding to one local router interface, multicast packets corresponding to the at least two clustered routing system interfaces are combined, and one copy of the combined multicast packet is made through replication and the copy is sent to the local router interface, so as to inhibit the repeated replication of the multicast packet, and save energy consumption.

When a certain local router determines that an interface through which the multicast packet is to be sent to another local router is the same as an interface through which the multicast packet enters the local router, the interface through which the multicast packet is sent to another local router is deleted from a preset forwarding interface list to prevent the multicast packet from being repeatedly forwarded between local routers, or prevent the same multicast packet from being successively forwarded by local routers, so as to prevent forming a loop or a deadlock and prevent a waste of system resources.

Figure 10:
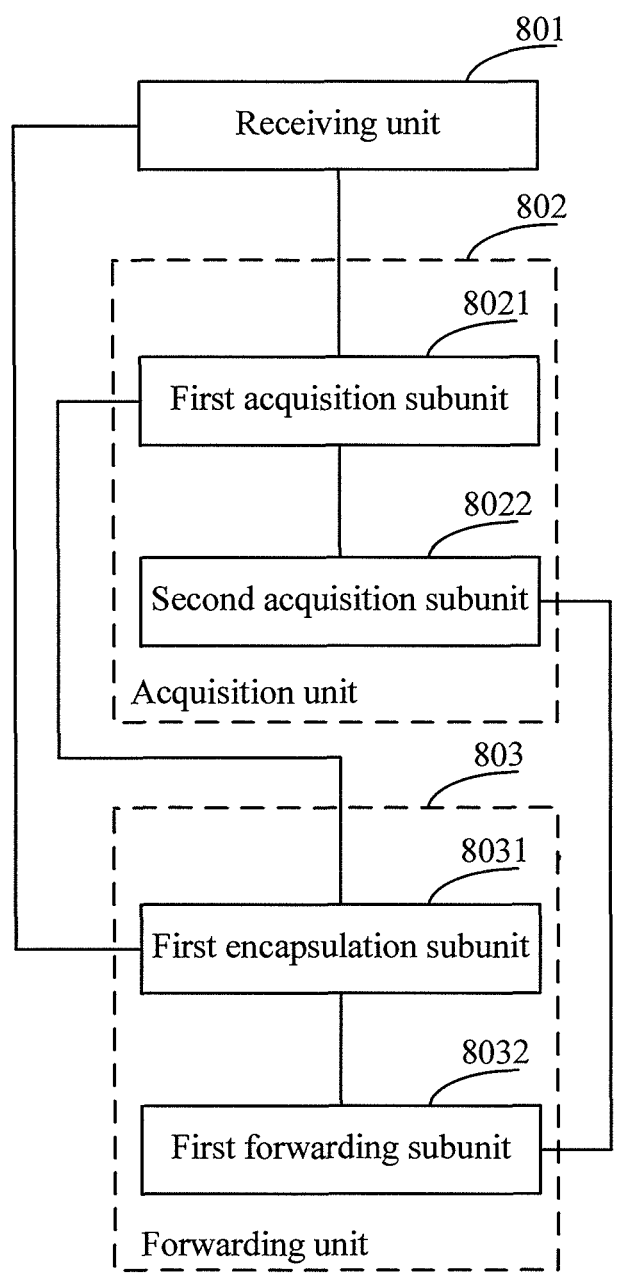
FIG. 10 is a schematic structural diagram of another apparatus for processing a multicast packet according to an embodiment of the present invention.

Referring to FIG. 10, FIG. 10 is a schematic structural diagram of another apparatus for processing a multicast packet provided in Embodiment 5 of the present invention. Compared with the multicast packet apparatus shown in FIG. 8, in the apparatus for processing a multicast packet shown in FIG. 10, the acquisition unit 802 may include the following units.

A first acquisition subunit 8021 is configured to acquire the clustered routing system interface corresponding to the multicast packet from the mapping between the multicast routing entry and the clustered routing system interface according to the multicast routing entry carried in the multicast packet received by the receiving unit 801.

The mapping between the multicast routing entry and the clustered routing system interface may be saved in the eMFIB depicted in the foregoing embodiment.

A second acquisition subunit 8022 is configured to acquire the local router interface corresponding to the multicast packet from the mapping between the clustered routing system interface and the local router interface in the clustered routing system according to the clustered routing system interface acquired by the first acquisition subunit 8021.

The mapping between the clustered routing system interface and the local router interface in the clustered routing system may be saved in the IFIB depicted in the foregoing embodiment.

In the apparatus for processing a multicast packet shown in FIG. 10, the forwarding unit 803 may include:

a first encapsulation subunit 8031, configured to encapsulate the clustered routing system interface acquired by the first acquisition subunit 8021 on the multicast packet as an identity; and a first forwarding subunit 8032, configured to send the multicast packet encapsulated with the identity through the local router interface acquired by the second acquisition subunit 8022 to a corresponding local router, so that the corresponding local router forwards, according to the identity, the multicast packet encapsulated with the identity to the clustered routing system interface for further transfer.

The corresponding local router queries its own IFIB according to the identity encapsulated on the multicast packet, to acquire a local router interface of the corresponding local router, sends the multicast packet encapsulated with the identity to a corresponding local router at a next level through the acquired local router interface, and the rest may be deduced by analogy, till the multicast packet encapsulated with the identity is forwarded to the clustered routing system interface for further transfer.

The identity may enable a slave node in the apparatus to directly find the outbound interface of the clustered routing system or the outbound interface of the local router, and rapidly send the packet to the interface, so as to save energy consumption, where the outbound interface of the clustered routing system or the outbound interface of the local router is indicated by the identity.

Figure 11:
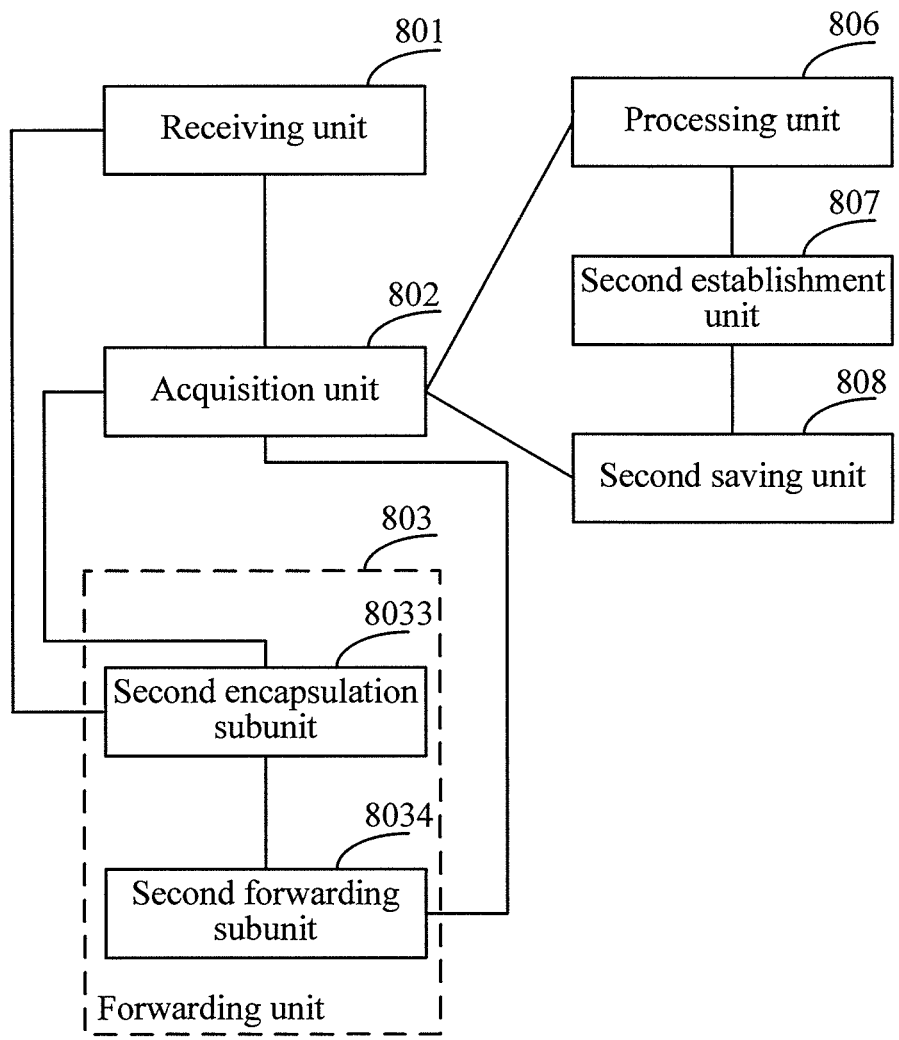
FIG. 11 is a schematic structural diagram of still another apparatus for processing a multicast packet according to an embodiment of the present invention.

Referring to FIG. 11, FIG. 11 is a schematic structural diagram of another apparatus for processing a multicast packet provided in Embodiment 5 of the present invention. Compared with the multicast packet apparatus shown in FIG. 8, the apparatus for processing a multicast packet shown in FIG. 11 is additionally disposed with the following units.

A processing unit 806 is configured to combine multicast routing entries having the same clustered routing system interface before the receiving unit 801 receives the multicast packet, allocate a corresponding internal shared tree IST identity, and save mapping between the multicast routing entry and the internal shared tree IST identity.

The mapping between the multicast routing entry and the internal shared tree IST identity saved by the processing unit 806 may be same as that in Table 10 in the foregoing embodiment, and is not repeated in this embodiment.

A second establishment unit 807 is configured to establish mapping between the internal shared tree IST identity and the local router interface in the clustered routing system according to the mapping between the multicast routing entry and the internal shared tree IST identity, the mapping between the multicast routing entry and the clustered routing system interface, and the mapping between the clustered routing system interface and the local router interface in the clustered routing system.

The mapping between the internal shared tree IST identity and the local router interface in the clustered routing system established by the second establishment unit 807 may be the same as that in Table 11 in the foregoing embodiment, and is not repeated in this embodiment.

A second saving unit 808 is configured to save the mapping between the internal shared tree IST identity and the local router interface in the clustered routing system established by the second establishment unit 807 in an internal multicast forwarding information base IMFIB of each local router.

In this case, the acquisition unit 802 may specifically acquire the internal shared tree IST identity from the mapping between the multicast routing entry and the internal shared tree IST identity, which is saved by the processing unit 806, according to the multicast routing entry carried in the multicast packet received by the receiving unit 801, and query the internal multicast forwarding information base IMFIB according to the acquired internal shared tree IST identity, to acquire the local router interface corresponding to the multicast packet.

In the apparatus for processing a multicast packet shown in FIG. 11, the forwarding unit 803 may include:

a second encapsulation subunit 8033, configured to encapsulate the internal shared tree IST identity, which is acquired by the acquisition unit 802, on the multicast packet; and a second forwarding subunit 8034, configured to send the multicast packet encapsulated with the internal shared tree identity through the local router interface acquired by the acquisition unit 802 to a corresponding local router, so that the corresponding local router forwards, according to the internal shared tree identity, the multicast packet encapsulated with the internal shared tree identity to the clustered routing system interface for further transfer.

The corresponding local router queries its own IMFIB according to the internal shared tree identity encapsulated on the multicast packet, to acquire a local router interface of the corresponding local router, sends the multicast packet encapsulated with the internal shared tree identity to a corresponding local router at a next level through the acquired local router interface, and the rest may be deduced by analogy, till the multicast packet encapsulated with the internal shared tree identity is forwarded to the clustered routing system interface for further transfer.

When the multicast packet is sent from the clustered routing system interface, the identity is removed from the multicast packet.

Through the apparatus for processing a multicast packet provided in the embodiment of the present invention, several routing devices can be clustered into a virtual routing system which externally acts as a single routing node for supporting a multicast service, so as to implement the efficient and reliable routing forwarding of the multicast packet in a clustered routing system with virtual aggregation, and enable the clustered routing system to support the multicast service with high efficiency and quality.

Persons of ordinary skill in the art may understand that all or a part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read-Only Memory (Read-Only Memory, ROM), a Random-Access Memory (Random-Access Memory, RAM), a magnetic disk, or an optical disk.

The method and the apparatus for processing a multicast packet provided by the embodiments of the present invention are introduced in detail above. Herein, the principle and implementation of the present invention are set forth through specific examples. The description of the embodiments is merely provided for ease of understanding the method and core ideas of the present invention. Meanwhile, persons of ordinary skill in the art can make modifications and variations to the present invention in terms of the specific implementation and application scope according to the ideas of the present invention. Therefore, the specification shall not be construed as a limit to the present invention.

What is claimed is:

1. A method for processing a multicast packet, the method comprising:

combining multicast routing entries having a same clustered routing system interface, allocating a corresponding internal shared tree identity, and saving mapping between a multicast routing entry and the internal shared tree identity;

establishing mapping between the internal shared tree identity and a local router interface in a clustered routing system according to the mapping between the multicast routing entry and the internal shared tree identity, mapping between the multicast routing entry and the clustered routing system interface, and mapping between the clustered routing system interface and the local router interface in the clustered routing system, and saving the mapping between the internal shared tree identity and the local router interface in an internal multicast forwarding information base of each local router;

receiving a multicast packet;

acquiring the local router interface corresponding to the multicast packet according to the multicast routing entry carried in the multicast packet; and forwarding the multicast packet through the acquired local router interface to the clustered routing system interface for further transfer.

2. The method according to claim 1, wherein acquiring the local router interface corresponding to the multicast packet according to the multicast routing entry carried in the multicast packet comprises:

acquiring the internal shared tree identity from the mapping between the multicast routing entry and the internal shared tree identity according to the multicast routing entry carried in the multicast packet, and querying the internal multicast forwarding information base according to the internal shared tree identity, to acquire the local router interface corresponding to the multicast packet.

3. The method according to claim 2, wherein forwarding the multicast packet through the acquired local router interface to the clustered routing system interface for further transfer comprises:

encapsulating the internal shared tree identity in the multicast packet; and sending the multicast packet encapsulated with the internal shared tree identity through the acquired local router interface to a corresponding local router, so that the local router forwards, according to the internal shared tree identity, the multicast packet encapsulated with the internal shared tree identity to the clustered routing system interface for further transfer.

4. The method according to claim 1, further comprising:

when at least two clustered routing system interfaces are corresponding to one local router interface, combining multicast packets corresponding to the at least two clustered routing system interfaces, making one copy of the combined multicast packet and sending the copy to the local router interface.

5. The method according to claim 1, further comprising:

if an interface through which the multicast packet is to be sent to another local router is the same as an interface through which the multicast packet enters a current local router, deleting the interface through which the multicast packet is to be sent to another local router from a preset forwarding interface list.

6. The method according to claim 1, further comprising:
when the multicast packet is sent from the clustered routing system interface, decreasing a TTL value carried by the multicast packet by 1.

7. An apparatus for processing a multicast packet, the apparatus comprising:
- a receiving unit, configured to receive a multicast packet;
- a processing unit, configured to combine multicast routing entries having a same clustered routing system interface, allocate a corresponding internal shared tree identity, and save mapping between the multicast routing entry and the internal shared tree identity, before the receiving unit receives the multicast packet;
- a second establishment unit, configured to establish mapping between the internal shared tree identity and a local router interface in a clustered routing system according to the mapping between the multicast routing entry and the internal shared tree identity, mapping between the multicast routing entry and the clustered routing system interface, and mapping between the clustered routing system interface and the local router interface in the clustered routing system;
- a second saving unit, configured to save the mapping between the internal shared tree identity and the local router interface in the clustered routing system, which is established by the second establishment unit, in an internal multicast forwarding information base IMFIB of each local router;
- an acquisition unit, configured to acquire the local router interface corresponding to the multicast packet according to the multicast routing entry carried in the multicast packet received by the receiving unit, wherein the acquisition unit is configured to acquire the internal shared tree identity from the mapping between the multicast routing entry and the internal shared tree identity, which is saved by the processing unit, according to the multicast routing entry carried in the multicast packet received by the receiving unit, and query the internal multicast forwarding information base according to the internal shared tree identity, to acquire the local router interface corresponding to the multicast packet; and a forwarding unit, configured to forward the multicast packet, which is received by the receiving unit, through the local router interface acquired by the acquisition unit to a clustered routing system interface for further transfer, wherein the forwarding unit comprises:
- a second encapsulation subunit, configured to encapsulate the internal shared tree identity acquired by the acquisition unit in the multicast packet; and
- a second forwarding subunit, configured to send the multicast packet encapsulated with the internal shared tree identity through the local router interface acquired by the acquisition unit to a corresponding local router, so that the local router forwards, according to the internal shared tree identity, the multicast packet encapsulated with the internal shared tree identity to the clustered routing system interface for further transfer.

\* \* \* \* \*